(12) United States Patent
Korst et al.

(10) Patent No.: US 7,970,752 B2
(45) Date of Patent: Jun. 28, 2011

(54) DATA PROCESSING SYSTEM AND METHOD

(75) Inventors: Johannes Henricus Maria Korst, Eindhoven (NL); Nicolas De Jong, Eindhoven (NL); Michael Petrus Franciscus Verschoor, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 463 days.

(21) Appl. No.: 11/577,824

(22) PCT Filed: Oct. 28, 2005

(86) PCT No.: PCT/IB2005/053478
§ 371 (c)(1),
(2), (4) Date: Apr. 24, 2007

(87) PCT Pub. No.: WO2006/046195
PCT Pub. Date: May 4, 2006

(65) Prior Publication Data
US 2009/0132478 A1    May 21, 2009

(30) Foreign Application Priority Data
Oct. 28, 2004  (GB) ................................. 0423879.6

(51) Int. Cl.
*G06F 17/30* (2006.01)
(52) U.S. Cl. ........................................ 707/708
(58) Field of Classification Search .................. 707/706, 707/707, 708, 736
See application file for complete search history.

(56) References Cited

U.S. PATENT DOCUMENTS

| | | | |
|---|---|---|---|
| 6,208,339 B1 | 3/2001 | Atlas et al. | |
| 6,363,377 B1 | 3/2002 | Kravets et al. | |
| 6,567,812 B1 | 5/2003 | Garrecht et al. | |
| 6,598,040 B1 * | 7/2003 | Cragun et al. | 707/3 |
| 6,772,150 B1 * | 8/2004 | Whitman et al. | 707/6 |
| 2002/0099700 A1 | 7/2002 | Li | |
| 2003/0033288 A1 * | 2/2003 | Shanahan et al. | 707/3 |

FOREIGN PATENT DOCUMENTS

| | | |
|---|---|---|
| EP | 0530993 A2 | 3/1993 |
| WO | 2004097671 A2 | 11/2004 |

OTHER PUBLICATIONS

ISR/Written Opinion of the International Searching Authority PCT/IB2005/053478.

* cited by examiner

*Primary Examiner* — Charles Kim
*Assistant Examiner* — Fatima P Mina

(57) ABSTRACT

A data processing method comprises receiving a search term, accessing a data store, the data store including at least one searchable element, selecting components of the search elements, each component containing the search term, and creating a list of the components, the list including an indicator of the occurrence of the component.

10 Claims, 3 Drawing Sheets

DATA PROCESSING SYSTEM AND METHOD

This invention relates to a data processing system and method, and to a computer program product comprising a computer readable medium containing computer executable instructions for carrying out the data processing method.

As computer technology has advanced, it has become possible to create electronic databases and systems such as the Internet that allow access to a vast amount of information. However this has created the problem that users cannot easily access the most relevant information, owing to the amount of data available. To assist users, a number of initiatives have been devised, principally in the two areas of, firstly, categorisation of the information, and, secondly, structure of the user's interface to the system.

For example, U.S. Pat. No. 6,363,377 discloses a search data processor, which is a tool to be used with a search engine for an information management system, and includes methods for refining, filtering, and organizing search queries and search results. A query tuner in the tool allows a user to automatically reformulate a query in order to find a reasonable number of matching documents from the search engine by selectively modifying individual search terms to be weaker or stronger and concurrently requesting a plurality of searches, each with a respectively different modified query. The tool also uses a dynamic filter, which employs a dynamic set of record tokens to restrict the results of an arbitrary search query to selectively include or exclude records that correspond to the set of record tokens. The tool also includes a results organizer, which aids the user in understanding and visualizing a large number of matching documents returned in response to a search query by clustering like items returned from the search. The query tuner, dynamic filter and results organizer can be used individually or in conjunction. The searched information management system can be consolidated or distributed and can span a global information network such as the Internet.

The system of this patent is designed to improve the recall or precision of existing search engines. It does not offer any way of better categorising the information in the searched database or information management system, nor how to acquire useful metadata concerning the stored information.

United States Patent Application Publication 2003/0033288 discloses a document-centric system with auto-completion and autocorrection. An information space is created using a document. Entities from the document and its information space are used to create a database of entities. An autocompletion system uses contextual information surrounding a fragment from the document to formulate a query. The query is used to identify a set of entities in the database of entities that complete the fragment. An autocorrection system uses contextual information from identified errors in the document to formulate a query. The query is used to identify a set of entities in the database of entities that correct the error.

However, the system described in this patent application requires a database of entities to be created for each document in the system. This is extremely inefficient in a number of ways, requiring storage of the extra information, and time and processing power to create the database of entities for each document. The described autocompletion system in the patent application is based upon a language sensitive system using parts of speech (nouns, adjectives etc.) and document classification. The autocompletion is also limited to those terms found within the database of entities for that document, which is a very limited set of terms.

It is an object of the present invention to improve upon the known art.

According to a first aspect of the present invention, there is provided a data processing method comprising receiving a search term, accessing a data store, the data store including at least one searchable element, selecting components of the search elements, each component containing the search term, and creating a list of the components, the list including an indicator of the occurrence of the component.

According to a second aspect of the present invention, there is provided a data processing system comprising a user interface device for receiving a search term, a processor arranged to access a data store, the data store including at least one searchable element, to select components of the search elements, each component containing the search term, and to create a list of the components, the list including an indicator of the occurrence of the component.

According to a third aspect of the present invention, there is provided a computer program product on a computer readable medium for controlling a data processing system, the computer program product comprising instructions for receiving a search term, accessing a data store, the data store including at least one searchable element, selecting components of the search elements, each component containing the search term, and creating a list of the components, the list including an indicator of the occurrence of the component.

Owing to the invention, it is possible to provide a data processing method and system that will return a meaningful list of extended terms, when provided with a search term, while being able to access known data storage systems to achieve this desired end.

This is particularly useful in situations where the search term is a single word, such as a surname, as the data processing method will return a list of likely completions of that single word, with an indication as to those that are meaningful and most relevant, without providing a very large amount of extraneous information. This short list of extended terms can be used to supplement the original term, thereby providing an automatic generation of metadata for a search term.

Advantageously, the indicator of the occurrence of each component is an integer. This provides the simplest embodiment of the step of rating the likelihood of the selected components being relevant. A count is kept of the occurrence of each component (which of course contains the original search term), and this is used to rank the detected components.

Preferably, the search term is a single word and a selected component contains no more than three words. This reduces the processing load and produces results that are most likely to be meaningful, as commonly occurring short phrases are most likely to be the type of data that will prove to be useful for composing further queries or compiling databases.

Advantageously, the selecting comprises selecting those components for which the ratio of searchable elements containing the component to those searchable elements that contain the portion of the component that is not the search term is above a predefined threshold. This ratio gives an effective method of selecting only those components that are likely to be of interest while excluding trivial and non-meaningful components.

Ideally, the data processing method further comprises choosing from the list the most relevant components. This step of choosing can be automatic, or could be executed by a user when filtering the results of the processing method. The method could select the five most commonly occurring components that contain the search result or a more complicated process could be designed to provide the list of components. The choosing could comprise removing from the list of components those components considered to be not meaningful. Whether a component is considered to be meaningful or not can be based upon a number or combination of factors, including a cross reference with the content of those elements that have been searched to find the components.

Embodiments of the present invention will now be described, by way of example only, with reference to the accompanying drawings, in which:—

Figure 1:
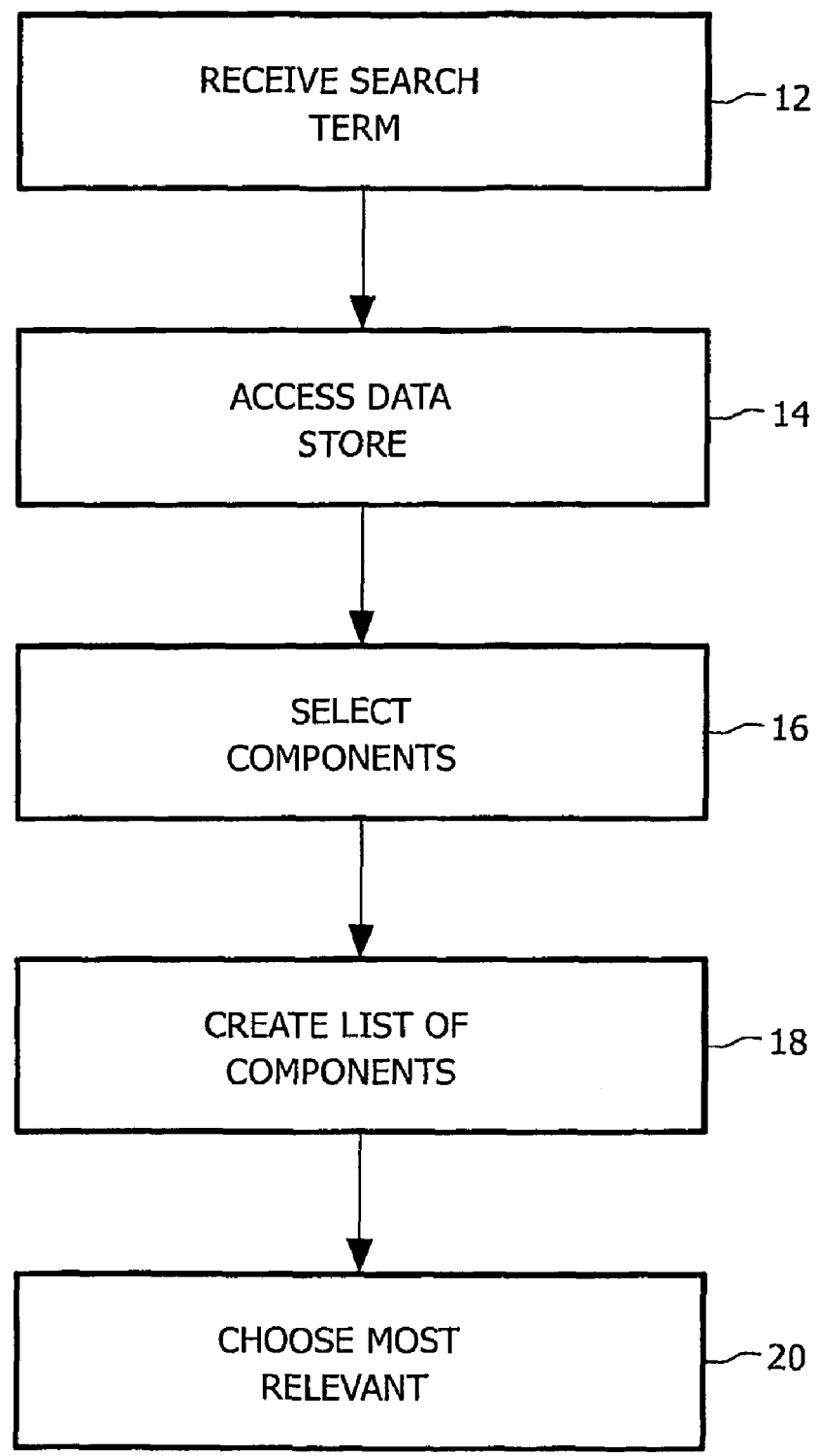
FIG. 1 is a flow diagram of a data processing method.

FIG. 1 shows a flow diagram of the data processing method. The method comprises receiving 10 a search term, accessing 12 a data store, the data store including at least one searchable element, selecting 14 components of the search elements, each component containing the search term, and creating 16 a list of the components, the list including an indicator of the occurrence of the component. The method further comprises selecting 18 from the list the most relevant components.

Figure 2:
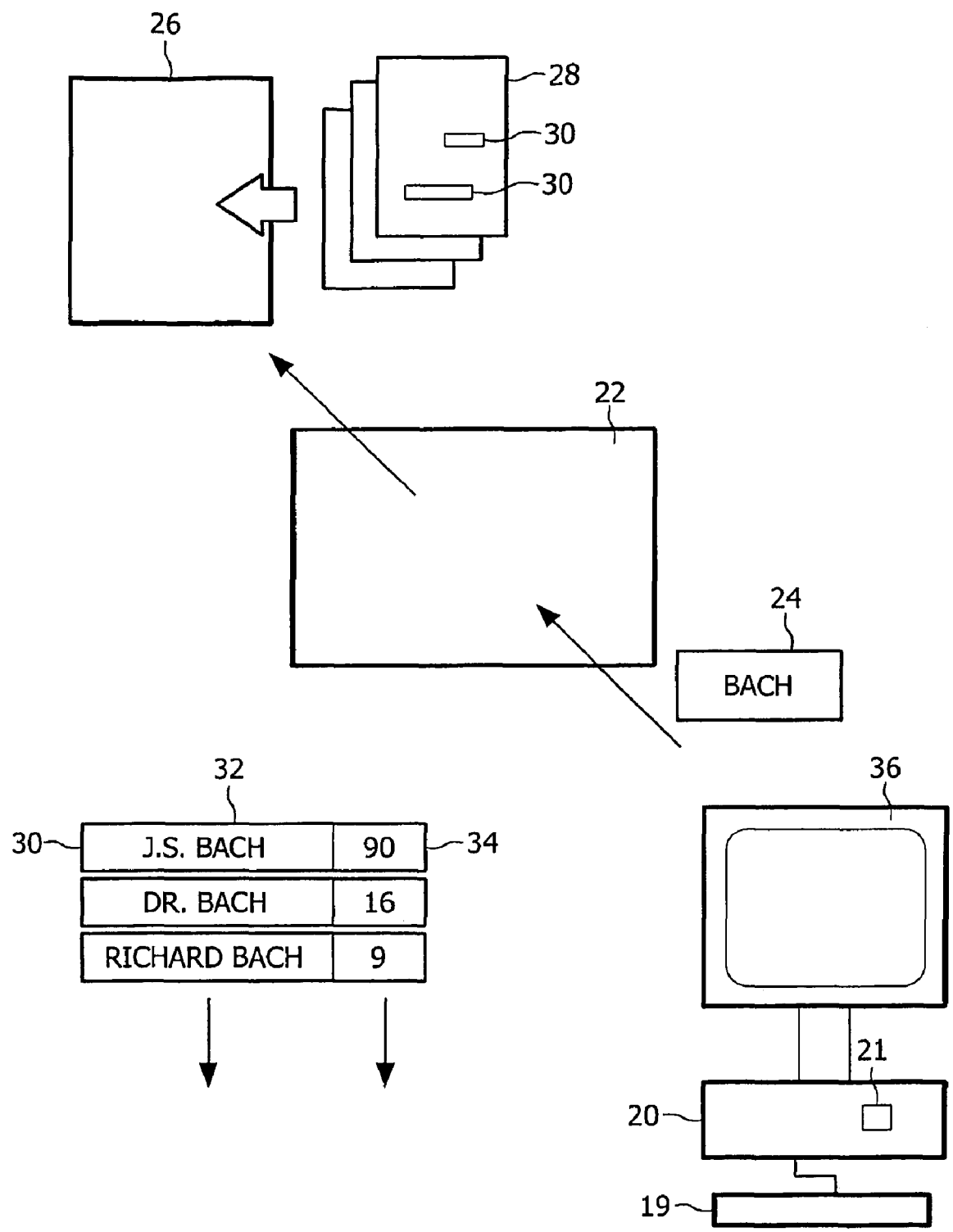
FIG. 2 is a schematic diagram of a data processing system.

The method is implemented on a computer such as a desktop PC 20 connected to the Internet 22, as shown in FIG. 2. The method can be used to complete a name that is specified as a search term or as a way of gathering metadata about a search term. In the embodiment shown in FIG. 2, a user has entered "BACH" as the search term 24, via the user interface device 19, which is a standard computer keyboard. The essence of the method is to seek out suffixes and prefixes for the term "BACH" that are commonly occurring to acquire further relevant information about the term "BACH". This further information that is acquired might be used for populating a database, or for assisting in creating a further search query.

In the example of FIG. 2, the search term 24 is a single word, although there is no reason why larger search terms cannot be used in the method. The user can enter any term that they choose, there are no restrictions on the format of the search term 24. In this example, the search term "BACH" is being used, with the desired aim of finding the most logical completion, or completions, of this surname.

The processor 21 of the PC 20 is arranged to access one or more data stores 26 via the Internet 22. These stores 26 would typically be websites maintained by commercial, or educational organisations, or by individuals as general interest websites. Search engines such Google (www.google.com) or Yahoo (www.yahoo.com) can be used to find web pages and documents that are available via the Internet 22 that contains a specific search term. In many cases, a single word will return many tens of thousands of web pages that contain the search term.

The PC 20, via the Internet 22 will connect to those data stores 26 that contain elements 28 that include the search term 24. The elements 28 will be web pages and files that are available via web pages.

The processor 21 of the PC 20 performs an analysis of each searchable element 28 that is found that contains the search term 24 ("BACH"). This analysis will look at the context in which each instance of the search term 24 is used in the searchable elements 28. This identifies particular components 30 of the elements 28 that include the search term 24. All prefixes and suffixes of the search term 24 are examined, and those that occur above a certain threshold (perhaps ten times) are considered to be components 30 that are worthy of monitoring.

Certain obvious and standard language usages such as the direct and indirect articles "the" and "a" are excluded from becoming considered to be components worth examining. In the case of a search term like "BACH", the word "by" as a prefix is returned extremely frequently, but this is the type of word that is excluded by the data processing method. Typically the selected components 28 contain no more than three words, although this variable can be adjusted by the user as desired.

If part of a name has been provided as the search term, then the data processing method is used to try to complete the partial name. Let the partial name be denoted by j. The basic idea is that the system will look in web pages for small sequences containing two or more words in which j is included and look for the most common, most meaningful of these sequences, as explained below.

The idea is best explained with reference to the example above. Once the system has been provided with the partial name "BACH", it can start to look for web pages that contain sequences of two words containing "BACH". This would result in a high hitrate for the sequence "SEBASTIAN BACH", and also relatively high hitrates for other combinations such as "BY BACH". By weighing the relative frequency of the single words "SEBASTIAN" and "BY", the system comes to the conclusion that "SEBASTIAN BACH" carries more information.

If i, j and k denote separate words that can occur in a web page, then for each word i, $p(i)$ denotes the probability that an arbitrary web page contains the word i. Hence, $p(i)$ is given by the ratio of the number of web pages containing word i divided by the total number of web pages. Similarly, for a sequence ij of the words i and j then $p(i,j)$ denotes the probability that an arbitrary web page contains this sequence. Given a word j that could be a partial name, such as "BACH", then the system is arranged to find words i for which the fraction below is relatively large.

$$\frac{p(i,j)}{p(i)}$$

One possible solution is to try to find the word i for which $p(i,j)/p(i)$ is a maximum, or a second possibility is to try to find a relatively short list of words i for which this probability is relatively large, as follows. As described above, the system searches for web pages containing the word j. This can be realized by using for example Google, and selecting the first n pages that it returns. The selected pages are then scanned for all occurrences of the word j, and this is used to determine which word is just before each of the occurrences of the word j (the search term "BACH"). In this way, it is possible to compile an array of all words i that occur just before j together with the number of times that this occurred.

For those words i that occurred most often, the system can then determine the total number of web pages with i j, by querying that sequence in Google, via a web browser. To enlarge the probability that some important words are not missed, the system reruns the search by only considering those pages that contain the word j but not any one of the word sequences i j that have been found so far. This can be repeated a number of times, until the additionally found words i all have a low $p(i,j)/p(i)$ value. Alternatively, the search can be stopped if the sum $\Sigma_i p(i,j)$ is close to $p(j)$, where the sum is over all words i that have been found so far.

By selecting pages that contain j, using Google, it is likely that sequences i j are found for which the fraction below is relatively large also.

$$\frac{p(i,j)}{p(j)}$$

The larger p(i,j), the larger the probability that i j occurs in the selected pages. Hence, in general, the problem of finding meaningful prefixes of a given word j is one of finding a prefix i, consisting of one or more words, such that the weighted sum $$\alpha \cdot \frac{p(i,j)}{p(i)} + (1-\alpha) \cdot \frac{p(i,j)}{p(j)}$$

is large, where $\alpha \in [0,1]$ can be chosen appropriately, and for which $$\frac{p(i,j)}{p(i)} \geq L_1 \text{ and } \frac{p(i,j)}{p(j)} \geq L_2$$

The lower bounds $L_1$ and $L_2$ are used to filter out less meaningful combinations. For example, 'Tebastian BACH' can be found on exactly one web page (according to Google). If this combination is found coincidentally, then it will have a relatively high score on p(i,j)/p(i), since 'Tebastian' only occurs 8 times. However, it will score very low on p(i,j)/(p(j)). Hence, the second lower bound will filter out this combination. Clearly, the lower bounds could also be replaced by an absolute threshold on p(i,j).

In the same way as the system looked for meaningful prefixes, it can also look for meaningful suffixes k.

In the case of the search term "BACH", a real scan of searchable material via the online search tool Google, revealed the following components for the search term 24, "BACH", with an indicator of the occurrence of each component, the indicator being an integer.

| Component | Occurrence |
|---|---|
| Johann Sebastian BACH | 689000 |
| J. S. BACH | 371000 |
| Richard BACH | 164000 |
| Carl Philipp Emanuel BACH | 20700 |
| Dr. BACH | 13600 |
| David BACH | 13400 |
| Gödel, Escher, BACH | 11200 |
| Carmel BACH Festival | 4020 |
| Oregon BACH Festival | 4000 |
| Eric BACH | 2800 |
| Edward BACH Centre | 1590 |
| San Francisco BACH Choir | 921 |

The occurrence in this case is the number of elements that contain the component, although an alternative measure would be to count the actual instance of each component in every element. In FIG. 2, a list 32 is populated as the method is being executed by the PC 20. The list 32 contains details of the components 30, with the occurrence 34 of each component, updated as the method is being run by the PC 20. This list 32 is displayed on the display device 34 of the PC 20.

The data processing method can also include a further step of refining the list 32, by selectively removing from the list 32 of components 30 those components 30 considered to be not meaningful. This may occur where a component 30 is detected as actually relating to many different objects, rather than a single object, which may result in overrating a particular component. In the example of the search term "BACH", a large number of components "JOHN BACH" are detected, but these clearly relate to several different people, and should therefore be discarded. This discarding may take place before or after the list 32 is presented to the user, with the user possibly being given the option of discarding those components 30 that are considered to be non meaningful.

Figure 3:
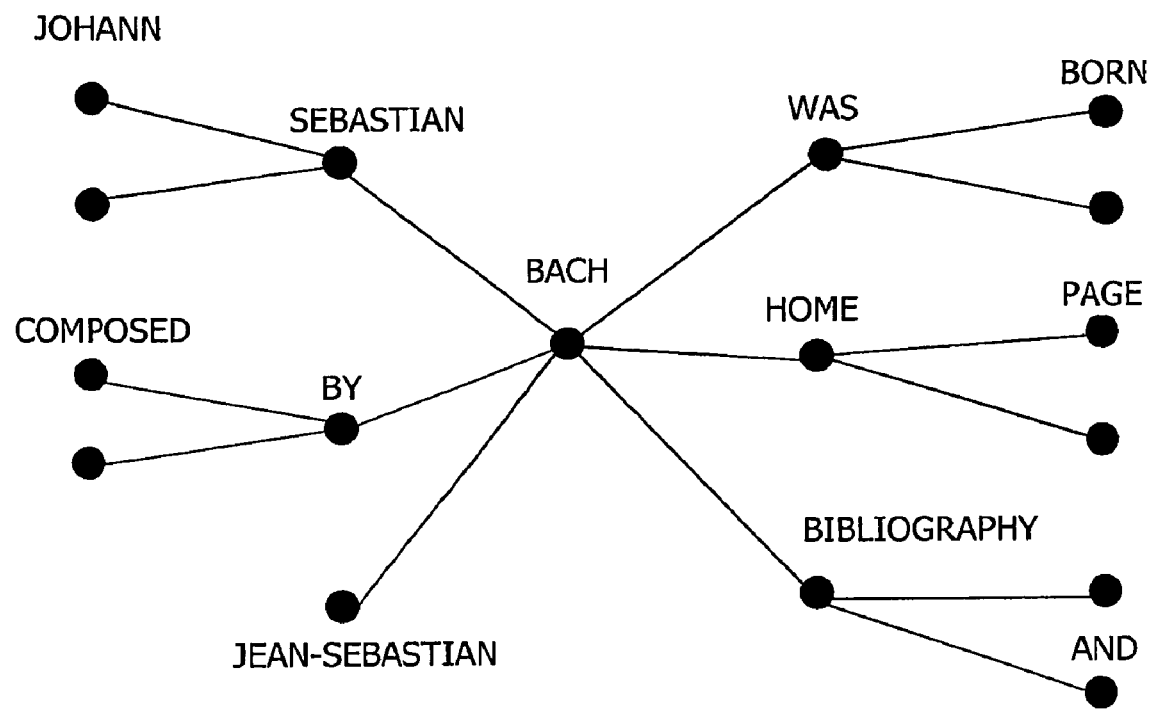
FIG. 3 is a sample neighbourhood tree for a search term.

Once the meaningful components 30 have been determined, the data processing method can execute a further step, if desired by the user, of analysing the interrelationship between the components 30. For example, the most common prefixes and the most common suffixes can be combined with the original search term 24 to create new search terms that can be processed in a simple hit rate measurement to create a neighbourhood tree, as shown in FIG. 3.

This Figure illustrates the tree for the original search term 24 "BACH", where the nodes in the tree correspond to words, and the root node (drawn in the middle) corresponds to the original term 24 used to initiate the search. The corresponding probabilities are not shown on the Figure, but this information is acquired by the PC 20 during the creation of the tree, and can be presented to the user, if they so desire.

To find meaningful sequences "ijk", the system considers combining sequences "ij" and "jk" for which both $$\frac{p(i,j,k)}{p(i,j)} \text{ and } \frac{p(i,j,k)}{p(j,k)}$$

are relatively large. In general the objectives are formulated as follows. For a given word "j", it is an aim to find sequences of words "ijk" for which the weighted sum below is large. In this sum i and k can consist of zero or more words and $\alpha \in [0,1]$.

$$\alpha \cdot \frac{p(i,j,k)}{p(i,j)} + (1-\alpha) \cdot \frac{p(i,j,k)}{p(j,k)}$$

It is also necessary that $$\frac{p(i,j,k)}{p(i,j)} \geq L_1 \text{ and } \frac{p(i,j,k)}{p(j,k)} \geq L_2$$

with the lower bounds $L_1$ and $L_2$ being used to filter out less meaningful combinations. For example, "Edwart BACH Centre" (obviously a typographical error), can be found on exactly one web page (according to the online search tool Google). If this combination is found coincidentally, then it will have a relatively high p(i,j)/p(i) score, since "Edwart" only occurs a small number of times throughout the pages searched by Google. Therefore the choice of the lower bounds can be used to eliminate results such as these, which are not relevant to the data processing method.

Adaptations to the method are possible, for example to find less frequently use middle names, which can be achieved by checking for sequences that can be obtained by inserting an additional word in a relatively common sequence. In this way it is possible to establish, for example, that "Rembrandt Harmenszoon van Rijn" is the full name of Rembrandt and that "Antonio Vivaldi" can be extended to "Antonio Lucio Vivaldi".

Another iteration that can be applied is, if the search term is any part of the name of a person, then the system can search for suffixes of the form "$n_1$-$n_2$", where $n_1$ and $n_2$ are integers between 0 and 2004 (currently), where $n_1 < n_2$ and where $n_2$-$n_1$ is not larger than 120, to find the years of birth and death of the corresponding person. Alternatively, by starting with a pair "$n_1$-$n_2$", one can determine the names of persons that lived in a particular time period. Likewise this can be used to determine interesting time periods that are of historical importance.

In addition to finding the most probable neighbourhood of individual words, the data processing system and method can also find the neighbourhood that frequently occurs for multiple words of the same type. For example, if there are a number of items that are of the same type, for example, a list of composer names, then the system can look for word sequences that frequently occur before or after each of these words.

In this way, it will be possible find for the composers example that "composed by" is a frequently occurring prefix. In addition, the system can check whether such frequently occurring sequences also co-occur often with items of a related type, for example writers, or painters. In this way, it is possible to establish that "composed by" is typical for composers, but that "written by" is used both in combination with authors and, to a lesser extent, also with composers.

This can be determined in a (semi-) automatic way. If there are determined typical pre- and suffixes for a given type, then they can be used when searching for additional items of that type. For example, if it is found that "composed by" is a typical prefix for a composer name, then possible candidate words, can be verified using this phrase. If "composed by" is found relatively often in respect of webpages containing a particular prefix or suffix for the candidate composer, then this raises the probability that indeed this is a name of a composer.

The invention claimed is:

1. A data processing method comprising:
    receiving a search term,
    accessing one or more data stores that include web pages and files, that include the received search term, wherein the search term is a single word,
    identifying particular components within the web pages and files, wherein said particular components comprise the received search term and an adjoining prefix or suffix proximal to and associated with the search term in said web pages and files, wherein the adjoining prefix or suffix constitute a portion of the particular components that is not the search term,
    selecting those identified particular components of the web pages and files that contain the search term for which a ratio is above a predefined threshold, wherein a selected component contains no more than three words,
    wherein the ratio comprises a numerator defined as those web pages and files containing the particular identified components including the search term divided by a denominator defined as those web pages and files that contain the adjoining prefix or suffix portion of the particular components that is not the search terms, and
    creating a list of the particular components, the list including an indicator of the occurrence of the particular components, wherein the indicator of the occurrence of each component is an integer,
    wherein the word length of the particular components is user determined.

2. A data processing method according to claim 1, and further comprising choosing from the list the most relevant components.

3. A data processing method according to claim 2, wherein the choosing comprises removing from the list of components those components considered to be not meaningful.

4. A data processing system comprising:
    a user interface device for receiving a search term, a processor arranged to:
    a) access a data store, the data store including at least one web page or file, wherein the search term is a single word,
    b) identify particular components of the at least one web pare or file, wherein said particular components comprise the search term and an adjoining prefix or suffix proximal to and associated with the search term in said at least one web pare or file, wherein the adjoining prefix or suffix constitutes a portion of the particular components that is not the search term, wherein a selected particular component contains no more than three words,
    c) select particular components of the at least one web page or file, that contain the search term for which a ratio is above a predefined threshold, wherein the ratio comprises a numerator defined as those web pages and files that contain the search term divided by a denominator defined as those web pages and files that contain the adjoining prefix or suffix portion of the particular components that is not the search term, wherein a selected particular component contains no more than three words, and
    d) create a list of the particular components, the list including an indicator of the occurrence of the particular components,
    wherein the word length of the particular components is user determined.

5. A data processing system according to claim 4, and further comprising a network interface, the processor arranged to access the data store via the network interface.

6. A data processing system according to claim 4, wherein the processor is further arranged to choose from the list the most relevant components.

7. A data processing system according to claim 6, wherein the choosing comprises removing from the list of components those components considered to be not meaningful.

8. A computer program product stored on a computer readable storage medium for controlling a data processing system, said program product comprising a plurality of computer executable instructions, wherein said instructions cause a computer to perform the steps of:
    receiving a search term,
    accessing one or more data stores that include web pages and files that include the received search term, wherein the search term is a single word,
    identifying particular components within the web pages and files, wherein said particular components comprise the received search term and an adjoining prefix or suffix proximal to and associated with the search term, wherein the adjoining prefix or suffix constitutes a portion of the particular components that is not the search term,
    selecting those identified particular components of the search elements that contain the search term for which a ratio is above a predefined threshold, wherein a selected particular component is determined by a user to contain no more than three words,
    wherein the ratio comprises a numerator defined as those web pages and files containing the particular identified components including the search term to those web pages and files that contain the adjoining prefix or suffix portion of the particular component that is not the search term, and creating a list of the particular components, the list including an indicator of the occurrence of the particular components, wherein the indicator of the occurrence of each particular component is an integer,
wherein the word length of the particular components is user determined.

9. A computer program product according to claim 8, the instructions further comprising choosing from the list the most relevant components.

10. A computer program product according to claim 9, wherein the choosing comprises removing from the list of components those particular components considered to be not meaningful.

* * * * *